United States Patent
Chincholi et al.

(10) Patent No.: US 11,985,607 B2
(45) Date of Patent: May 14, 2024

(54) DYNAMIC TRANSMIT POWER ADJUSTMENT

(71) Applicant: Apple Inc., Cupertino, CA (US)

(72) Inventors: Amith Vikram Chincholi, Sunnyvale, CA (US); Anthony Tsangaropoulos, San Carlos, CA (US); Sumit Verma, San Carlos, CA (US); Mariam Motamed, Redwood City, CA (US); Divyaprakash Bhojkumar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 17/311,552

(22) PCT Filed: Nov. 27, 2019

(86) PCT No.: PCT/US2019/063720
§ 371 (c)(1),
(2) Date: Jun. 7, 2021

(87) PCT Pub. No.: WO2020/123162
PCT Pub. Date: Jun. 18, 2020

(65) Prior Publication Data
US 2022/0030525 A1    Jan. 27, 2022

Related U.S. Application Data
(60) Provisional application No. 62/778,798, filed on Dec. 12, 2018.

(51) Int. Cl.
*H04W 52/36* (2009.01)
*H04B 17/14* (2015.01)
(Continued)

(52) U.S. Cl.
CPC .......... *H04W 52/367* (2013.01); *H04B 17/14* (2015.01); *H04W 52/06* (2013.01); *H04W 52/262* (2013.01)

(58) Field of Classification Search
CPC . H04W 52/367; H04W 52/06; H04W 52/262; H04B 17/14
See application file for complete search history.

(56) References Cited

U.S. PATENT DOCUMENTS

| 10,420,161 B1 * | 9/2019 | Sava ................... H04W 72/542 |
| 2013/0172045 A1 * | 7/2013 | Caballero ........... H04W 52/367 |
| | | 455/571 |

(Continued)

FOREIGN PATENT DOCUMENTS

| WO | 2017172789 A1 | 10/2017 | |
| WO | WO-2017172789 A1 * | 10/2017 | ........... H04L 1/1812 |

OTHER PUBLICATIONS

Nokia et al. "Introduction of band 53 into TS 36.101", R4-1814103, 3GPP TSG-RAN WG4 Meeting #88bis, Oct. 17, 2018. (Year: 2018).*

(Continued)

*Primary Examiner* — John J Lee
(74) *Attorney, Agent, or Firm* — Kowert, Hood, Munyon, Rankin & Goetzel, P.C.

(57) ABSTRACT

An apparatus of user equipment (UE) includes processing circuitry coupled to a memory, where to configure the UE for dynamic transmit power adjustment, the processing circuitry is to decode baseband configuration information received from a base station. The baseband configuration information including at least a modulation and coding scheme (MCS), resource block (RB) allocation, and carrier assignment for uplink (UL) transmission and downlink (DL) reception. A communication mode is selected based on the baseband configuration information. An additional maxi- (Continued)

mum power reduction (A-MPR) is determined based on the baseband configuration information and the selected communication mode. UL data is encoded for transmission to the base station via the selected communication mode and using transmit power adjusted based on the determined A-MPR. New signaling enhancements between the UE and the network (on a Uu interface) and between two UEs (on a PC5 sidelink interface) are also disclosed.

20 Claims, 5 Drawing Sheets

(51) Int. Cl.
*H04W 52/06* (2009.01)
*H04W 52/26* (2009.01)

(56) References Cited

U.S. PATENT DOCUMENTS

2015/0087352 A1  3/2015  Lim et al.
2015/0271824 A1  9/2015  Zhang et al.

OTHER PUBLICATIONS

Nokia et al., "Introduction of Band 53 into TS 36.101", 3GPP TSG-RAN WG4, Meeting #88bis, R4-1814103, Oct. 2018, Chengdu, China, 49 pgs.

International Search Report and Written Opinion for International Application No. PCT/US2019/063720, dated Mar. 26, 2020, 8 pgs.

* cited by examiner

DYNAMIC TRANSMIT POWER ADJUSTMENT

PRIORITY CLAIM

This application is a U.S. National Stage filing of International Application No. PCT/US2019/063720, filed Nov. 27, 2019, which claims the benefit of priority to the U.S. Provisional Patent Application Ser. No. 62/778,798, filed Dec. 12, 2018, and entitled "DYNAMIC TRANSMIT POWER ADJUSTMENT," each of which is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Other aspects are directed to dynamic transmit power adjustment.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modem society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for dynamic transmit power adjustment.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
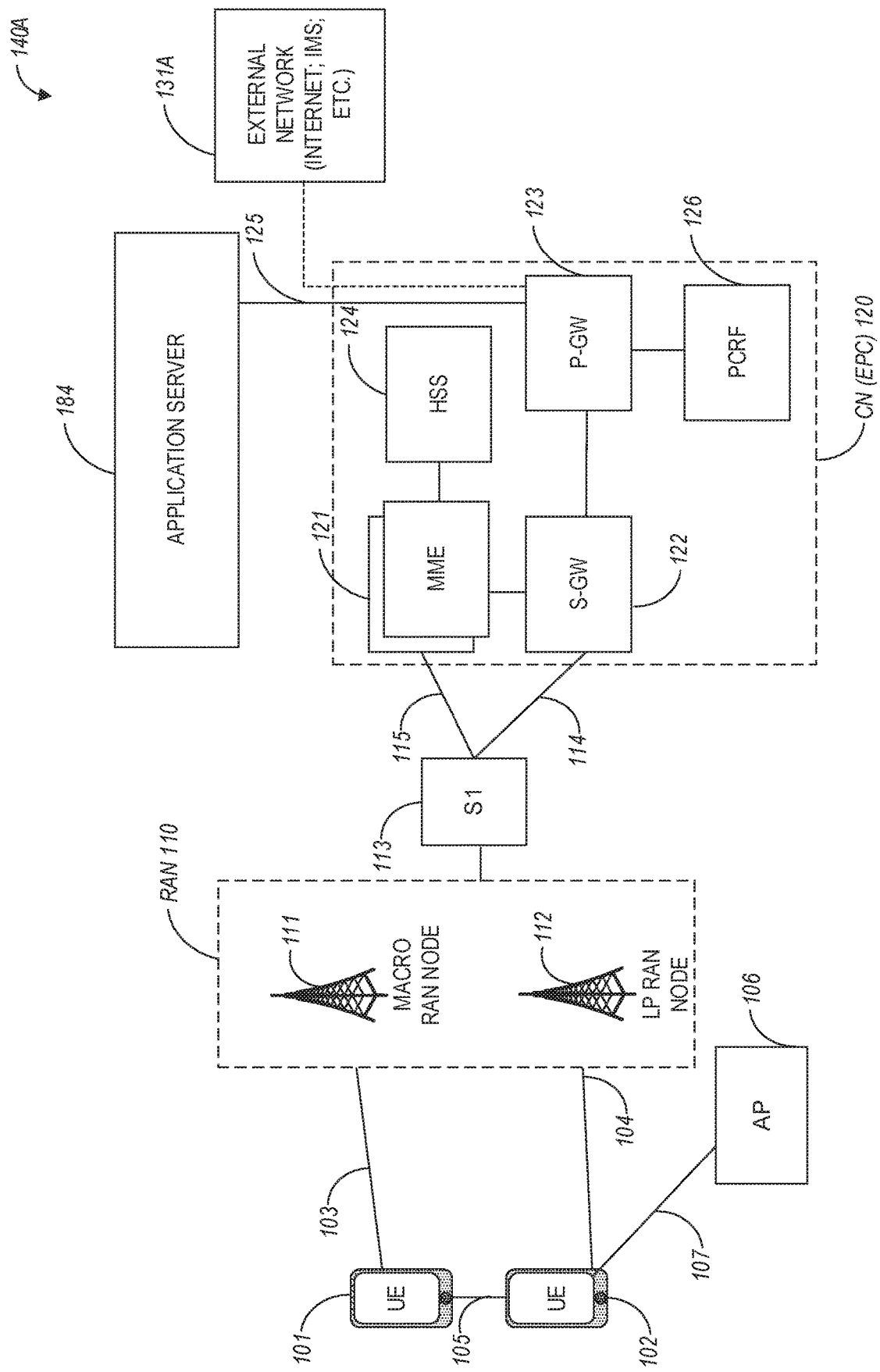
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-11). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
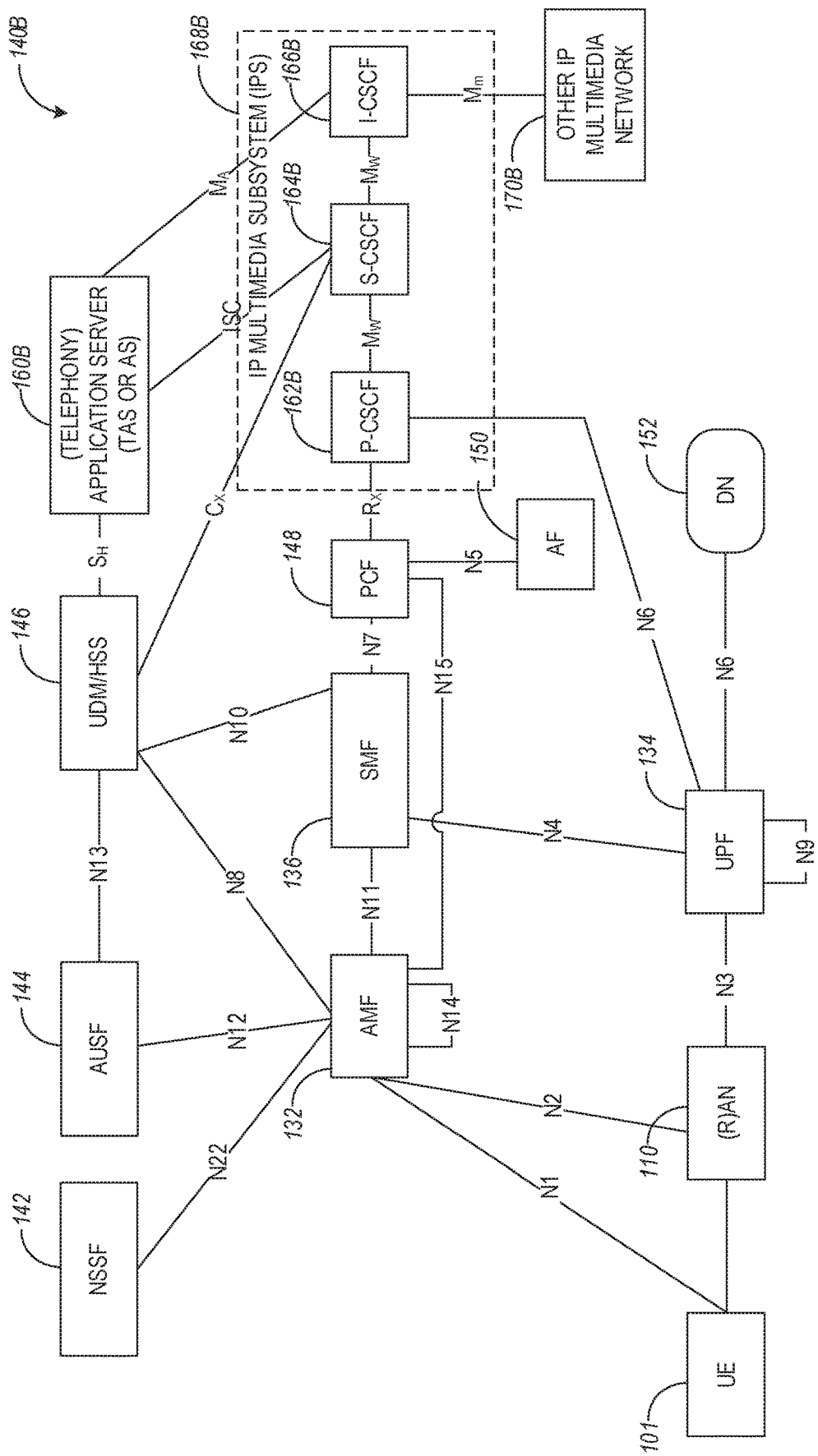
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
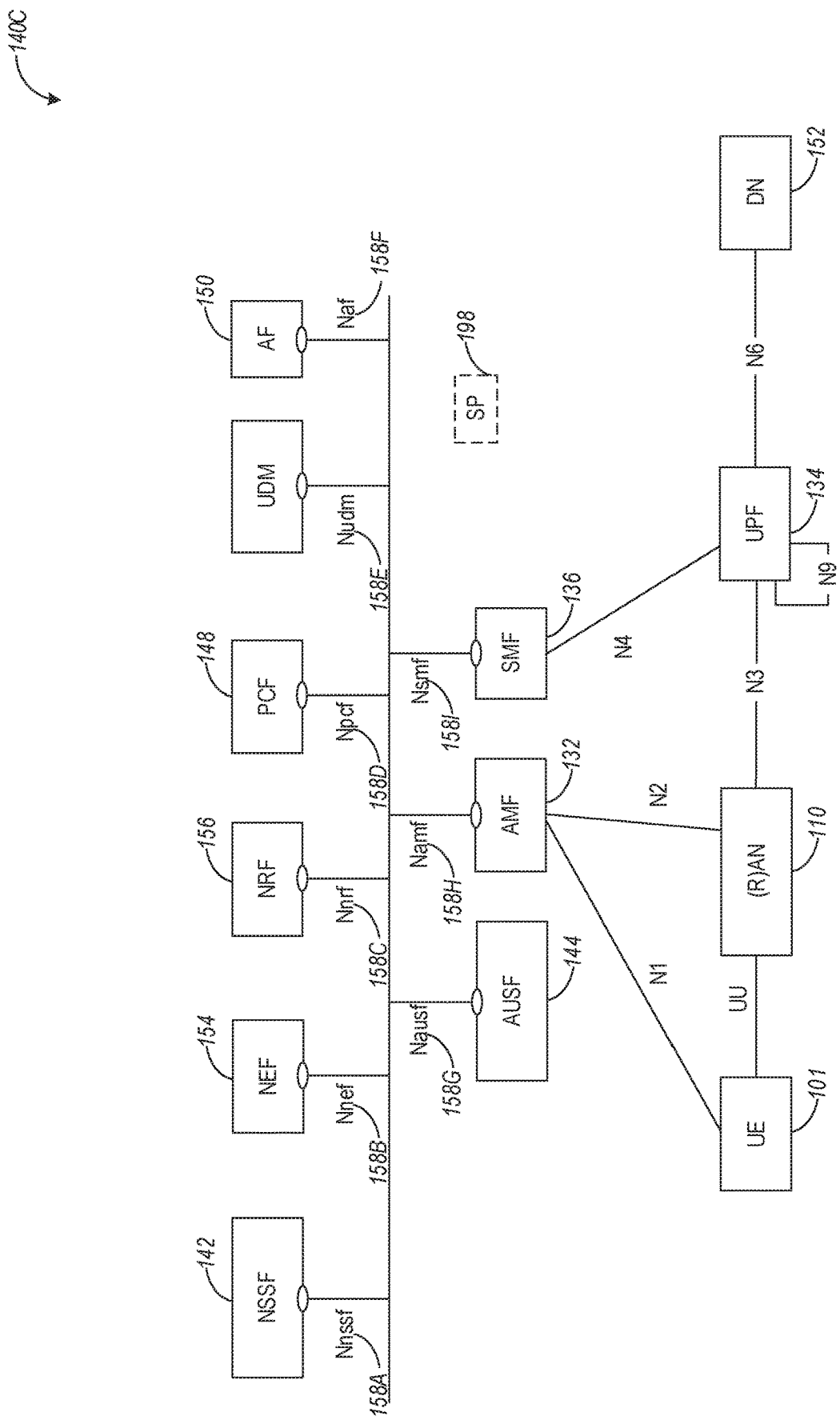

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE or a base station (e.g., any of the UEs or base stations illustrated in connection with FIG. 1A-FIG. 1C).

UE transmit (Tx) power may impact radio frequency (RF) emissions into other bands, receive (Rx) sensitivity, UE battery life, and uplink (UL) coverage. 3GPP specifications may specify a worst-case additional maximum power reduction (A-MPR) for various bands/band combinations to limit RF emissions. However, 3GPP requirements for using A-MPR are applicable only in the worst-case configuration of UE parameters. Using A-MPR under the conventional 3GPP requirements (e.g., using worst-case A-MPR for a given band/band combination regardless of the actual network signaling and transmitter front end (TxFE) configuration) could result in UL coverage loss, higher current consumption, and/or deteriorated UL demodulation performance closer to a cell edge.

A-MPR can be optimized in several scenarios, including (a) higher than optimal Tx power (i.e., aggressively low A-MPR), which can cause RF emissions due to harmonics, inter-modulation distortions (IMDs) resulting in violation of adjacent channel leakage ratio (ACLR), spectral emissions mask (SEM), reference sensitivity (RefSens) requirements, and high UE power consumption; and (b) lower than optimal Tx power (i.e., pessimistically high A-MPR), which can cause degraded performance and UL coverage loss closer to cell-edge.

Previous solutions for Tx power adjustment use few parameters specific to one radio access technology (RAT) (e.g., LTE). With 5G and the new addition of the EUTRA-New Radio (NR) dual connectivity (EN-DC) and NR-NR DC scenarios, the number of parameters and combinations that can be considered for dynamic Tx power adjustment increases. Additionally, prior solutions for Tx power adjustment do not consider an adaptive architecture to adjust baseband modem parameters using feedback and also signaling to inform the network.

Techniques discussed herein can be used for dynamic Tx power adjustment, including an adaptive dynamic A-MPR algorithm for a given band/band combination. The disclosed techniques include identifying parameters and requirements/constraints to be used to determine the instantaneous A-MPR, determining the optimized A-MPR to be used, provide signaling enhancements for UE to suggest parameter configuration to the network (e.g., UE assistance information), potential future 3GPP enhancements, and optimized UL transmit parameter configuration back to baseband modem. Enhancements associated with the disclosed techniques include optimized UE Tx power for multiple transmit parameter combinations, limiting RF emissions into other bands, minimizing Rx sensitivity impact, improving UE battery life, improving UL coverage, reducing maximum permissible exposure (MPE) and specific absorption rate (SAR), and meeting 3GPP and regulatory requirements.

Figure 2:
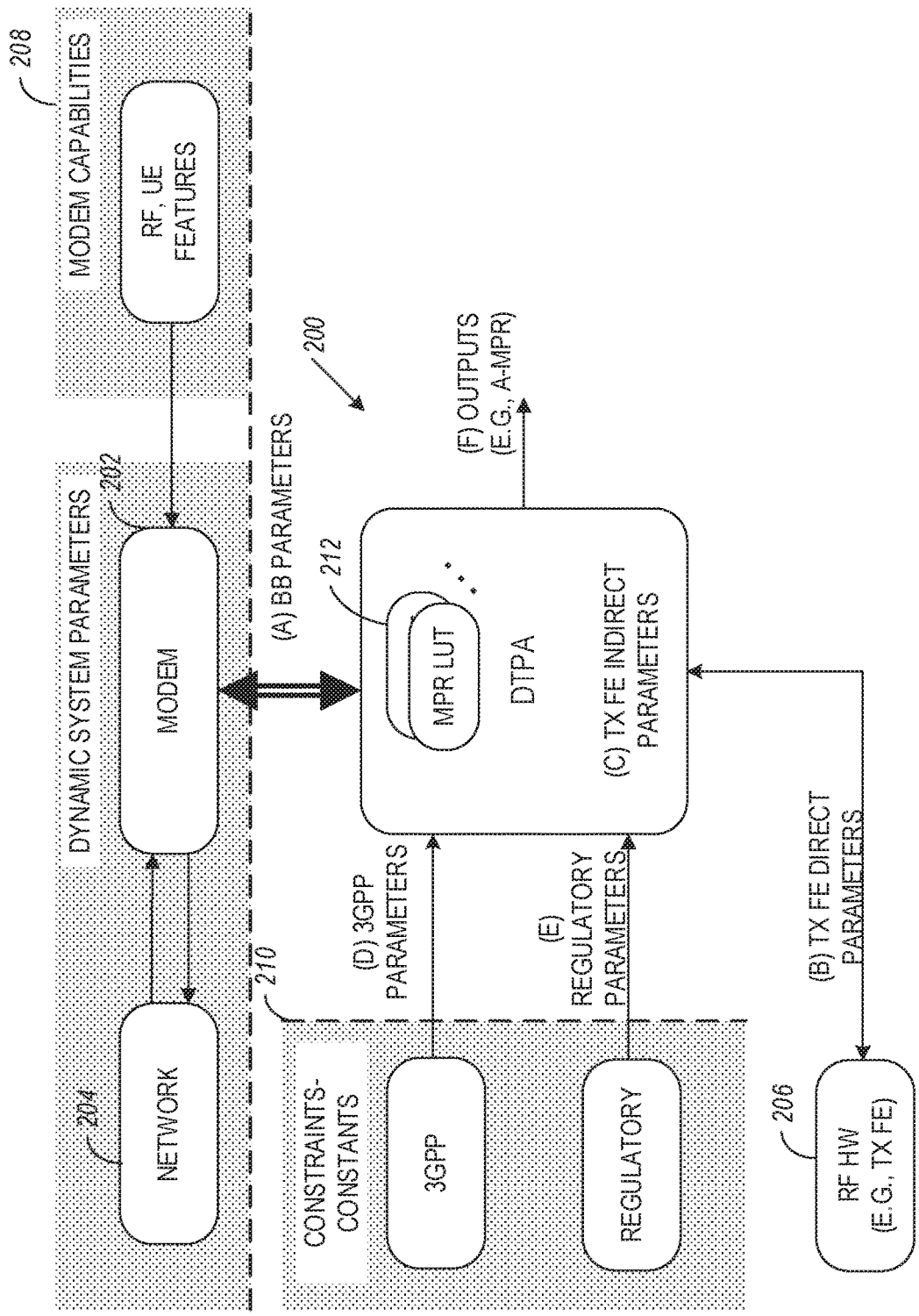
FIG. 2 illustrates a dynamic transmit power adjustment (DTPA) module, in accordance with some aspects.

FIG. 2 illustrates a dynamic transmit power adjustment (DTPA) module 200, in accordance with some aspects. The DTPA 200 can be part of a UE and can be configured to use one or more of the techniques discussed herein for dynamic Tx power adjustment. The DTPA 200 can be in communication with the network 204 via a modem 202 in order to obtain or provide dynamic system parameters. Modem capabilities 208, which includes RF and UE features, associated with the modem 202 can also be communicated to the DTPA 200.

In an example embodiment, the DTPA 200 is configured to receive the following parameters as inputs: (A) baseband (BB) parameters associated with the network 204 or the modem 202; (B) TX front-end (FE) direct parameters associated with RF hardware 206 (e.g., TX FE); (C) TX FE indirect parameters, which can be stored as part of the DTPA 200; (D) 3GPP parameters (constraints and constants) associated with one or more 3GPP technical specifications; and (E) regulatory parameters (constraints and constants), including parameters that can be indicated/set by one or more regulatory institutions associated with communications and signal power, including the International Commission on Non-ionizing Radiation Protection (ICNIRP) and the Federal Communications Commission (FCC). The DTPA 200 can further include one or more lookup tables (LUTs) 212, such as MPR LUTs or other types of LUTs discussed herein (including power management maximum power reduction (P-MPR) and A-MPR LUTs). Such LUTs map the vector of input parameters and some derived parameters from them to the corresponding table and the specific entry in the table. The DTPA 200 can use one or more of the techniques discussed herein and generate outputs (F) using the inputs (A)-(E).

The outputs (F) can include parameters for communication to TxFE (e.g., RF hardware 206) to optimize settings, parameters to BB to optimize modem configuration, and parameters to BB to be signaled back to the network 204. The outputs (F) include A-MPR or other types of parameters used for dynamic Tx power adjustment as well as other parameters that can be used to configure the RF hardware 206, baseband circuitry such as the modem 202, as well as the network 204. The inputs (A)-(E), as well as the outputs (F), are discussed in greater detail hereinbelow.

Input (A): BB Parameters Influencing Tx Power

The input (A) parameters include one or more of the following:

Modulation and Coding Scheme (MCS) in LTE (signaled by the network to the UE; at least 29 possibilities); MCS in NR (signaled by the network to the UE; at least 28 possibilities); NR TX Start Time and Duration (derived by the modem 202 based on Tx/Rx format signaled by the network); LTE TX Start Time and Duration (derived by the modem 202 based on Tx/Rx format signaled by the network); Bandwidth (BW)/resource block (RB) allocation in LTE (signaled by the network to the UE; innumerable possibilities, including discontinuous allocations, such as up to 100 PRBs in LTE 20 MHz BW); BW/RB allocation in NR (signaled by the network to the UE; innumerable possibilities, including discontinuous allocations, such as up to 275 PRBs in NR 400 MHz BW); UL waveform in NR (signaled by the network; 2 possibilities (DFT-S-OFDM, CP-OFDM)); LTE Tx Power Control (TPC) (signaled by the network; 4 possibilities); NR TPC (signaled by the network; 4 possibilities); frequency band LTE (selected and camped on by the UE and then signaled by the network; ~80 bands in 3GPP); frequency band NR (selected and camped on by the UE and then signaled by the network; ~36 bands in 3GPP); carrier assignment in DL and UL in LTE (signaled by the network to the UE; innumerable possibilities); carrier assignment in DL and UL in NR (signaled by the network to the UE (innumerable possibilities); Power Head Room (PHR) per power amplifier (PA) (measured by the modem internally and used as a criterion (based on a threshold) to determine actions such as dropping NR link autonomously, etc., to protect VoLTE in EN-DC); LTE NS_Signaling (networki signaling that is signaled by the network; at least 7 possibilities); LTE Tx Power (P_LTE; computed by the UE; innumerable possibilities); NR Tx Power (P_NR, computed by the UE; innumerable possibilities); Total EN-DC Tx Power (P_ENDC; signaled by the network to the UE; innumerable possibilities); Type_I_Type_II_UE (stored in the UE as its capability; 2 possibilities); Cross_Link_Interference_from_gNB (measured at the gNB and signaled to the UE; this parameter can be called Cross_Link_Interference_from_RxUE for side link communications; it can be measured at a receiver UE and signaled to transmitter UE in case of sidelink communications); LTE sounding reference signal (SRS): SRS_Offset_and_Periodicity (signaled by the network to the UE); LTE SRS_Freq_Hopping (signaled by the network to the UE); NR SRS_Offset_and_Periodicity (signaled by the network to the UE); NR SRS_Freq_Hopping (signaled by the network to the UE); UL Transform Precoding for LTE (signaled by the network; $2^{numTxAnt}$ possibilities); UL Transform Precoding for NR (signaled by the network; $2^{numTxAnt}$ possibilities); Sub-Carrier Spacing in NR; QoS-related constraints (e.g., latency constraints, reliability constraints, packet loss rate constraints); Doppler estimate; Average BLER estimate; Reliability features; UCI repetition level; and PUSCH Repetition level.

Input (B): TxFE Direct Parameters Influencing Tx Power

The input (B) parameters include one or more of the following:

PA_gain based on gain state (PAs in the UE can have multiple gain states). When there is a Tx power imbalance between carriers in carrier aggregation (CA) or RATs in DC, PA gain state can be controlled either based on stronger Tx power signal or based on higher priority signal (e.g., VoLTE prioritized over data on NR in EN-DC).

Front-End Insertion Loss. Analog components in Tx FE (e.g., diplexer/triplexer, etc.) can add insertion loss which reduces the effective Tx power. In this regard, Tx power at an antenna port is effectively the output power of PA/SPAD minus the corresponding amount of dB insertion loss.

PA saturation power (P_sat), which is defined by the PA power class.

PA Nonlinearity Qualitative Characteristics (based on the PA type), including intercept points defined as IPx i.e. IP3, IP5, etc.; XdB compression point; Volterra/Taylor series behavioral model; and AM-AM/PM curves.

Digital Pre-Distortion (DPD) implementation (to account for some of the non-linearities), including plain DPD (i.e., Taylor series) and memory DPD (i.e., Volterra series).

Envelope Tracking Implementation (envelope tracking (ET) versus average power tracking (APT) mode).

Reverse inter-modulation (IM), which is applicable to 2PA/2TX scenarios and depends on antenna isolation.

Antenna characteristics, including directivity and efficiency.

Duplexer rejection, which can include the following rejection values: for frequency <780 MHz, the rejection is 30 dB; for frequency between 780-804 MHz, the rejection is 40 dB; for frequency between 859-869 MHz, the rejection is 55 dB; for frequency between 869-894 MHz, the rejection is 50 dB; and for frequency of 2H or 3H, the rejection is 40 dB.

Input (C): TxFE Indirect Parameters Influencing Tx Power

The input (C) parameters include one or more of the following:

Impedance mismatch: voltage standing wave ratio (VSWR), or reflection coefficient, or reflected power per band/antenna.

When impedance between the antenna and the baseband is not matched, there is reflected power from the antenna creating a standing wave (which is measured by VSWR or reflection coefficient). This reflected power reduces the Tx power of the UE on the particular band resulting in coverage loss. In some aspects, a LUT can be maintained in the UE (e.g., as one of LUTs 212) to map VSWR (or a reflection coefficient) to reflected power (dB). In this regard, Tx power at an antenna port is effectively the output power of PA/SPAD minus the corresponding amount of dB reflected power. An example is shown in TABLE 1 below.

TABLE 1

| VSWR | REFLECTED POWER (dB) | | | |
| --- | --- | --- | --- | --- |
| | Band A | Band B | Band C | Band D |
| 1.0 | −inf | −inf | −inf | −inf |
| 1.5 | −20 | −35 | −28 | −40 |
| 2.0 | −12 | −18 | −14 | −10 |
| ... | ... | ... | ... | ... |
| 10.0 | −1 | −5 | −3 | −2 |

Cross-Talk between Tx ports. Antenna S-parameters S12, S21, etc and/or Z-parameters Z12, Z21, etc.

PA Calibration Gap support per FR. PA calibration gaps in NR is used to enable UEs to implement DPD techniques without resorting to highly complex implementations involving dedicated feedback receiver chains. The PA calibration gap would allow the UE to utilize the gap to calibrate its PA without introducing additional RF chains into the implementation. This, in turn, allows UEs with reasonable implementation complexity to achieve higher operating points in the non-linear region of the PA while meeting the 3GPP requirements. UE capability determines if it supports the PA calibration gap or not. No PA calibration supported by UE may imply need for higher MPR depending on the band.

TPC inaccuracies. Power jumps (e.g., TPC settling during OFF to ON transition).

Additional BB inaccuracies, including amplitude variation/nonlinearity, phase-shifter amplitude inaccuracy, and phase-shifter insertion loss.

Interference-related, including spur cancellation, UE_self_interference, jammer, and modulated_spur.

Body_proximity_sensor (e.g., mmWave-based sensor).

Thermal sensor parameters.

Antenna array gain, which is a function of the number of antennas in the array, polarization gain, and antenna roll-off loss as a function of frequency.

Antenna efficiency, such as conducted efficiency, dielectric efficiency, etc.

Overall implementation losses taking into account, e.g., form factor; planar radome loss based on radome shape, thickness, and material; radiation efficiency; thickness of the glass layer; and distance between the array and glass.

Effective Isotropic Radiated Power (EIRP) cumulative distribution function (CDF) percentile point used to optimize the Tx power.

Directivity loss in dB as a function of elevation and azimuth angles.

Input D): 3GPP Parameters and Requirements Influencing Tx Power

The input (D) parameters include one or more of the parameters indicated by TABLE 2 below (and specified by 3GPP TS 38.101 or other 3GPP specifications):

TABLE 2

| Parameter | Originates at | Depends on | Influences | Range of values | Description |
|---|---|---|---|---|---|
| PHR per PA | BB | $P_{CMAX}$, RRC parameter | PHR calculation | INTEGER (−23 ... 40) | Pwr Headroom computed by BB |
| NS_Signaling | RAN | | | | how it flows to RF ... |
| LTE Tx Power: P_LTE | BB | RRC parameter | Maximum Tx power calculation | INTEGER (−30 ... 33), | The maximum total transmit power to be used by the UE in the LTE cell group |
| NR Tx Power: P_NR | BB | RRC parameter | Maximum Tx power calculation | INTEGER (−30 ... 33), | The maximum total transmit power to be used by the UE in the NR cell group |
| Total EN-DC Tx Power: P_ENDC | BB | RRC parameter | Maximum Tx power calculation | INTEGER (−30 ... 33), | The maximum total transmit power to be used by the UE |
| Type_I_Type_II_UE | BB | Constant? | | | |
| DPS Support | BB | UE | NR transmit power calculation | | UE indicates a capability for dynamic power-sharing between EUTRA and NR |
| $P_{CMAX\_L\_LTE, f, c}$ & $P_{CMAX\_L\_NR, f, c}$ | BB | band; power class; RRC parameters; Antenna port; MCS | Maxmum Tx power calculation | [−40~31] | Lower limit of LTE/NR transmission power |
| $P_{CMAX\_H\_LTE, f, c}$ & $P_{CMAX\_H\_NR, f, c}$ | BB | band; power class; RRC parameters, Antenna port; MCS | Maxmum Tx power calculation | [−40~31] | higher limit of LTE/NR transmission power |
| $\Delta T_{C\_E\text{-}UTRA, c}$ | BB | LTE band; LTE power class | Maximum Tx power calculation | {0, 1.5} | Allowed operating band edge transmission power relaxation for serving cell c |
| $\Delta T_{C\_NR, c}$ | BB | NR band, NR power class | Maximum Tx power calculation | {0, 1.5} | Allowed operating band edge transmission power relaxation for serving cell c |

TABLE 2-continued

| Parameter | Originates at | Depends on | Influences | Range of values | Description |
|---|---|---|---|---|---|
| $\Delta P_{PowerClass}$ | BB | UE/NW; Operation band; RRC parameters | Maxmum Tx power calculation | {−3, 0, +3}; (class1 not list) | Maximum Tx power adjustment for a given power class |
| $P_{EMAX, c}$ | BB | RRC parameter | Maxmum Tx power calculation | INTEGER (−30 . . . 33), | Maximum allowed UE output power signaled by higher layers for serving cell c |
| $\Delta T_{RxSRS}$ | BB | Tx/Rx antenna port | Maxmum Tx power calculation | {0, 3} | Maximum Tx power adjustment for a given SRS |
| ACS | | | | | Adjacent Channel Selectivity |
| $D_{TIB}$ | BB | NR bands; LTE bands | Maxmum Tx power calculation | (0, 0.3, 0.5, 0.6, 0.8} | Additional tolerance for serving cell c with two band combination |
| $D_{RIB}$ | BB | | | | |
| $MPR_c$ | BB | RB location; MCS; DFT | Maxmum Tx power calculation | [0~6.5] | Maximum power reduction for serving cell c |
| $AMPR_c$ | BB | RB location; MCS; DFT | Maxmum Tx power calculation | [0~15.5] | Additional Maximum power reduction for serving cell c |
| P-$MPR_c$ | | ensuring compliance with applicable electromagnetic energy absorption requirements | Maximum Tx power calculation | ? | Maximum allowed UE output power reduction for serving cell c |

Input (E): Regulatory Parameters and Requirements Influencing Tx Power

The input (E) parameters include ICNIRP and FCC limits or other parameters influencing Tx power, such as maximum Tx power and maximum EIRP limits based on antenna array area and the number of antenna elements.

DTPA Outputs (E)

DTPA outputs may be determined based on one or more inputs selected from inputs (A), (B), (C), (D), and/or (E), and may include:

Outputs to the TxFE (e.g., RF hardware 206), including A-MPR (which can be for each Tx port).

Outputs to BB (e.g., to modem 202) may include: DPD mode (for each PA); ET-APT mode (for each PA); UL waveform mode (for each NR UL); Minimum preferred spacing between non-contiguous RB allocations; Minimum preferred contiguous RB allocation; and 'k' frequency Ranges [f1_start, f2_end], . . . , [fk_start, fk_end] where SEM violations are observed.

Outputs to the network 204 (through the modem 202) may include: channel allocation (for each LTE/NR RAT); BW/RB allocation (for each LTE/NR RAT); UL waveform mode (for each NR UL); dB improvement in Tx power with respect to current channel/RB/UL waveform allocation; alternate suggested values for all or any subset of the parameters (either the alternate parameter value itself or only the delta/change from the already configured parameter value) for inputs (A) (such as MCS in LTE, MCS in NR, NR TX Start Time and Duration, LTE TX Start Time and Duration, BW/RB Allocation in LTE, BW/RB Allocation in NR, UL Waveform in NR, LTE TPC, NR TPC, Frequency Band LTE, Frequency Band NR, Carrier assignment in DL and UL in LTE, Carrier assignment in DL and UL in NR, PHR per PA, LTE NS_Signaling, LTE Tx Power: P_LTE, NR Tx Power: P_NR, Total EN-DC Tx Power: P_ENDC, Type_I_Type_II_UE, Cross_Link_Interference_from_gNB, Cross_Link_Interference_from_RxUE in case of UE-UE sidelink communication, LTE SRS_Offset_and_Periodicity, LTE SRS_Freq_Hopping, NR SRS_Offset_and_Periodicity, NR SRS_Freq_Hopping, UL Transform Precoding for LTE, UL Transform Precoding for NR, Sub-Carrier Spacing in NR); and Alternate/Adjusted latency, reliability and packet loss rate metrics that the UE can support based on all parameters (these can be signaled either as absolute values or as relative values with regard to the ones signaled by the network to the UE, i.e., incremental/delta change; if incremental/delta change is used, a LUT can be preconfigured in the UE and the gNB to map each delta change to a fixed number of bits to be signaled).

In some aspects, the following considerations can be taken into account when determining the outputs (F) of the DTPA 200:

Mask violations (e.g., for spectral emissions masks in inputs D) may reduce significantly with the number of RBs and proximity between the RBs;

DPD may help significantly for the larger number of RBs (e.g., if the network is notified and more RBs are requested, DPD may decrease as a result);

For 1-RB blocks (e.g., devil's horns configuration) with QPSK, A-MPR may be implemented at RB distances of 20-25 RBs; and For 5-RB blocks, A-MPR may be implemented at RB distances of 20-25 RBs at ~25 dBm.

As discussed herein, a transmitter can include a UE transmitting to a base station (e.g., a gNB) on an uplink (i.e., on the Uu interface). Techniques discussed herein also apply to the case where the UE is transmitting directly to another UE on a sidelink (i.e., using a PC5 interface). Techniques discussed herein can also be extended to the case where the transmitter and receiver are a part of the direct backhaul link as well (i.e., an X2 interface).

In some aspects, on each interface (e.g., Uu, X2, or PC5), the communication protocol could be either one or multiple simultaneous protocols. In other words, an interface could only be using the 5G NR protocol or LTE-NR dual connectivity, and so on.

Techniques discussed herein refer to BW/RB allocation on the UL. In the case of 5G NR protocol, Uu BWP is used in the case of UL or DL transmission, while sidelink (SL) bandwidth part (BWP) is used in the case of sidelink transmissions. BW/RB allocation implies either a fraction of the carrier bandwidth (e.g., BWP), or the full carrier bandwidth (e.g., CC BW), or even much greater that the assigned carrier bandwidth as in the case of an ultra-wideband (UWB) transmissions.

In some aspects, in the case of UE to gNB UL communications, the UE can select the UL waveform and signal it to the gNB in advance (e.g., which waveform the UE intends to use and the future slot or symbol number when it becomes effective). Alternatively, the gNB can select the waveform to be used on the UL and may signal the same to the UE on the DL.

In some aspects, in the case of UE-to-UE sidelink/direct communication, either the sender UE can pick the waveform and signal it to the receiver UE in advance (e.g., which waveform it intends to use and the future slot or symbol number when it becomes effective), or the receiver UE can pick the waveform to be used and may signals the same to the UE on the reverse link. Alternatively, the gNB can signal to both UEs which waveform to use while a dedicated Uu link to each UE is active.

In some aspects, functionalities performed by the DTPA (e.g., a DTPA algorithm) can be considered to be residing on the transmit device, i.e., UE on UL Uu interface, or on both devices in the sidelink/direct UE-UE PC5 interface, or backhaul/X2 interface. Alternatively, the DTPA can reside in the cloud or on the network edge closer to the Uu interface thus reducing the implementation complexity on the user devices.

In some aspects, the DTPA algorithm may be partitioned such that part of it resides on the transmit device and the remaining part resides on the receive device.

In some aspects, the DTPA algorithm may be partitioned such that part of it resides on the transmit device and the remaining part resides in the cloud or the network edge closer to the user device.

In some aspects, if DTPA is partitioned as mentioned in the last two possibilities, one way to do so would be to have parameters of inputs (A) on the gNB or at the network edge or in the cloud, while parameters of inputs (B) and (C) can reside on the UE in the case of an active Uu interface.

In some aspects, another way to control Tx power is to enable DTPA to dynamically adjust VWSR of the antenna/TxFE chain on the band/bands being used to optimize MPR/AMPR/PMPR.

Dynamic Tx Power Adjustment (DTPA) Processing Flow

A more detailed description of example steps that can be performed by the DPLA in connection with dynamic TX power adjustment is discussed hereinbelow.

A UE can be configured in one of the following communication modes (or communication scenarios): Scenario A: LTE standalone (SA) only; Scenario B: NR SA only; Scenario C: LTE+NR DC scenario; and Scenario D: NR+NR DC scenario. A UE may select one of the communication modes listed above based on configuration parameters communicated by the network (e.g., one or more of the input (A) parameters)

Step 1: LUTs 212 can be generated based on measurements, calibrations, and/or other requirements.

For each scenario, lab measurements and/or simulations can be performed to measure A-MPR for every parameter combination associated with Input (A) parameters, and the results are stored in the corresponding A-MPR LUT (e.g., one or more of LUTs 212).

In some aspects, for Scenario A, existing A-MPR tables can be reused if needed as a starting point and modified further as needed.

In some aspects, the RF front-end parameters associated with Inputs (B) and (C) can be calibrated and stored in a table (e.g., RFCal Data).

In some aspects, some parameters may be functions of the carrier frequency, number of antenna elements, band, etc., and may be stored in the LUTs 212.

In some aspects, 3GPP and regulatory requirements on ACLR/SEM/RefSens/Spurious Emissions/SAR, etc. may be stored in the LUTs 212, since requirements may be specified for various parameter configurations.

In some aspects, the MPR/A-MPR/P-MPR requirements from one or more 3GPP technical specifications (e.g., from TS 38.101, 38.102, and 38.103) may be stored for each band/band combination in the LUTs 212, since requirements are specified for various parameter configurations.

Step 2: Method to apply Tx power adjustments.

In some aspects, a Band/Band combination of interest is identified, as well as all Tx/Rx parameters and RF parameters. The corresponding LUTs 212 may be used based on the identified parameters and/or band combinations of interest. A-MPR may be obtained using the LUTs and may be applied based on which RATs are ON in a specific duration, i.e. the corresponding A-MPR table is used in that duration based on scenario A/B/C/D. In some aspects, FW/RFFE maintains look ahead timestamps for each Tx On/Off and Rx On/Off for each RAT.

In some aspects, a Tx power adjustment is applied at the PA input (of one or more PAs of the UE) based on the RF front-end parameter calibration by looking up RFCal Tables (e.g., adjust the PA input power taking into account power loss due to aspects like VSWR (impedance mismatch) as a function of band number, front-end duplexer/diplexer insertion loss per band, duplexer rejection per frequency range, etc.).

In some aspects, Tx power adjustment may also be applied based on sensor data. For example, the following sensor data may be used. Thermal sensor data: increase/decrease Tx power to manage heat dissipation. This can be done based on pre-calibrated LUTs or equations which map 'x' dB backoff for 'y' Joules of heat dissipation. Power Management Integrated Circuit (PMIC) data: increase/decrease Tx power to manage current consumption. This can be done based on pre-calibrated LUTs or equations which map 'x' dB backoff for 'y' mA of current draw. Body proximity sensor data: increase/decrease Tx power to manage MPE/SAR. This can be done based on pre-calibrated LUTs or equations which map 'x' dB backoff for 'y' cm distance of human tissue to UE.

Step 3: Parameter feedback from DTPA to the BB modem and the network.

The output (F) parameters including feedback parameters (e.g., DPD mode, ET-APT mode, and UL waveform mode) are communicated to the modem 202 for subsequent Tx configuration changes. The modem 202 may signal specific output parameters back to the network 204, including updated channel allocation, updated RB allocation, and UL waveform mode. The A-MPR output is communicated to the TX FE for dynamic power adjustment.

Figure 3:
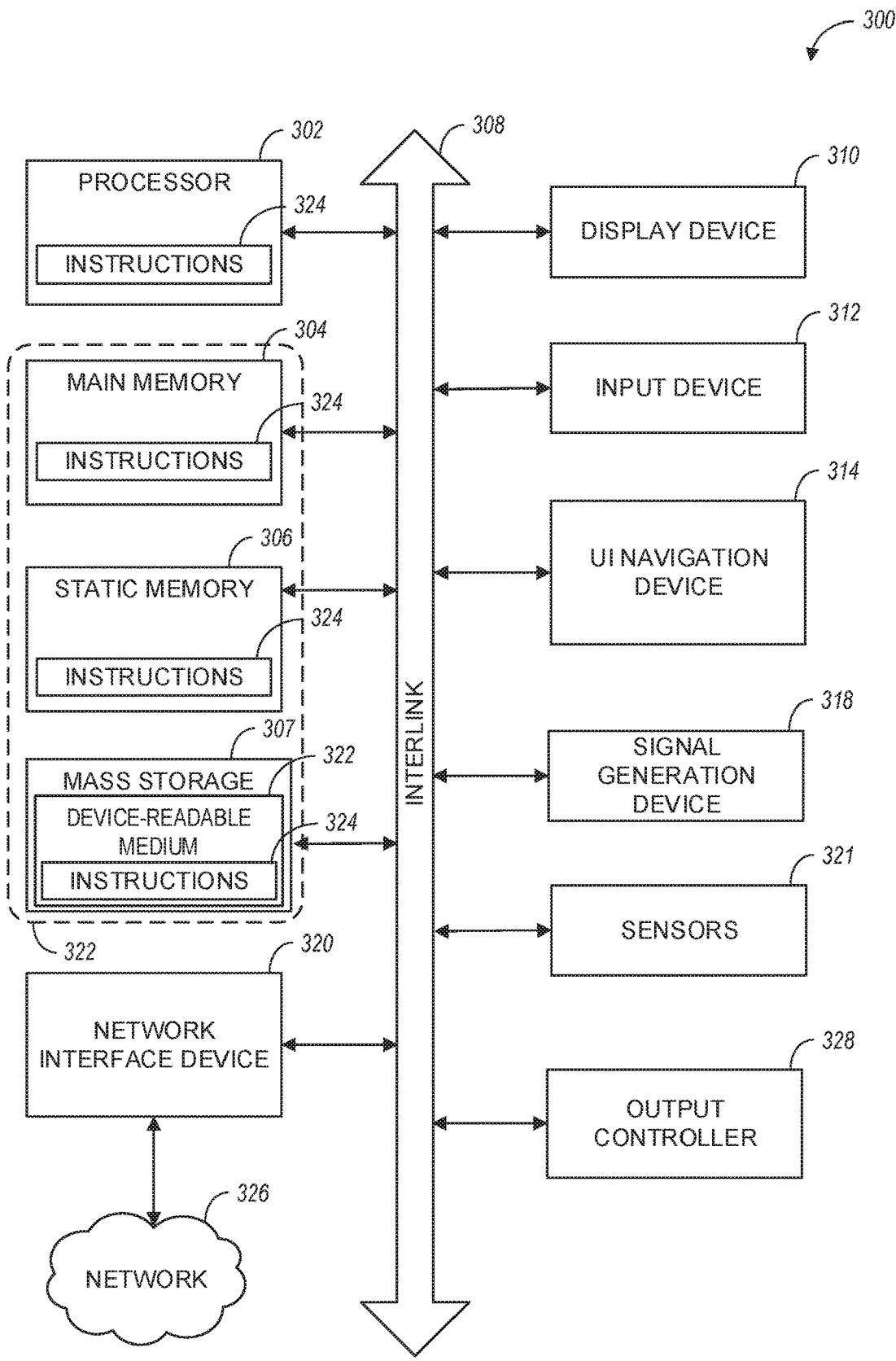
FIG. 3 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 3 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 300 may operate as a standalone device or may be connected (e.g., networked) to other communication devices.

Circuitry (e.g., processing circuitry) is a collection of circuits implemented in tangible entities of the device 300 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 300 follow.

In some aspects, the device 300 may operate as a standalone device or may be connected (e.g., networked) to other devices. In a networked deployment, the communication device 300 may operate in the capacity of a server communication device, a client communication device, or both in server-client network environments. In an example, the communication device 300 may act as a peer communication device in peer-to-peer (P2P) (or other distributed) network environment. The communication device 300 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 300 may include a hardware processor 302 (e.g., a central processing unit (CPU), a graphics processing unit (GPU), a hardware processor core, or any combination thereof), a main memory 304, a static memory 306, and mass storage 307 (e.g., hard drive, tape drive, flash storage, or other block or storage devices), some or all of which may communicate with each other via an interlink (e.g., bus) 308.

The communication device 300 may further include a display device 310, an alphanumeric input device 312 (e.g., a keyboard), and a user interface (UI) navigation device 314 (e.g., a mouse). In an example, the display device 310, input device 312 and UI navigation device 314 may be a touch-screen display. The communication device 300 may additionally include a signal generation device 318 (e.g., a speaker), a network interface device 320, and one or more sensors 321, such as a global positioning system (GPS) sensor, compass, accelerometer, or another sensor. The communication device 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 307 may include a communication device-readable medium 322, on which is stored one or more sets of data structures or instructions 324 (e.g., software) embodying or utilized by any one or more of the techniques or functions described herein. In some aspects, registers of the processor 302, the main memory 304, the static memory 306, and/or the mass storage 307 may be, or include (completely or at least partially), the device-readable medium 322, on which is stored the one or more sets of data structures or instructions 324, embodying or utilized by any one or more of the techniques or functions described herein. In an example, one or any combination of the hardware processor 302, the main memory 304, the static memory 306, or the mass storage 316 may constitute the device-readable medium 322.

As used herein, the term "device-readable medium" is interchangeable with "computer-readable medium" or "machine-readable medium". While the communication device-readable medium 322 is illustrated as a single medium, the term "communication device-readable medium" may include a single medium or multiple media (e.g., a centralized or distributed database, and/or associated caches and servers) configured to store the one or more instructions 324. The term "communication device-readable medium" is inclusive of the terms "machine-readable medium" or "computer-readable medium", and may include any medium that is capable of storing, encoding, or carrying instructions (e.g., instructions 324) for execution by the communication device 300 and that cause the communication device 300 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 324 may further be transmitted or received over a communications network 326 using a transmission medium via the network interface device 320 utilizing any one of a number of transfer protocols. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input-multiple-output (SIMO), MIMO, or multiple-input-single-output (MISO) techniques. In some examples, the network interface device 320 may wirelessly communicate using Multiple User MIMO techniques.

The term "transmission medium" shall be taken to include any intangible medium that is capable of storing, encoding or carrying instructions for execution by the communication device 300, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus comprising:
a memory; and
at least one processor in communication with the memory, wherein to configure a user equipment (UE) for dynamic transmit power adjustment, the at least one processor is configured to:
decode baseband configuration information received from a base station, the baseband configuration information including at least a modulation and coding scheme (MCS), resource block (RB) allocation, and carrier assignment for uplink (UL) transmission and downlink (DL) reception;
determine a communication mode from a plurality of available communication modes based on the baseband configuration information, wherein the plurality of communication modes correspond to a plurality of radio access technologies (RATs);
determine an additional maximum power reduction (A-MPR) based on the baseband configuration information and the RAT of the determined communication mode; and
encode UL data for transmission to the base station via the selected communication mode and using transmit power adjusted based on the determined A-MPR.

2. The apparatus of claim 1,
wherein the plurality of available communication modes include an LTE standalone (SA) communication mode, a New Radio (NR) SA communication mode, LTE-NR dual connectivity (DC) communication mode, and an NR-NR DC communication mode.

3. The apparatus of claim 1,
wherein the at least one processor is configured to:
generate at least one A-MPR look-up table (LUT) for each of the plurality of available communication modes based on baseband parameters within the baseband configuration information, the baseband parameters associated with transmit (TX) power; and
determine the A-MPR using the at least one A-MPR LUT.

4. The apparatus of claim 3, wherein the baseband parameters signaled to the UE include one or more of the following:
NR TX start time and duration,
LTE TX start time and duration,
LTE bandwidth (BW) allocation,
NR BW allocation,
NR UL waveform,
LTE TX Power Control (TPC),
NR TPC, LTE frequency band,
NR frequency band,
LTE TX power,
NR TX power,
total EUTRA-NR DC (EN-DC) TX power, and
cross-link interference measured at the base station.

5. The apparatus of claim 3,
further comprising transceiver circuitry coupled to at least one antenna, and wherein the at least one processor is configured to:
update the at least one LUT for each of the plurality of available communication modes based on radio frequency (RF) calibrations of front-end (FE) circuitry of the transceiver circuitry, wherein the RF calibrations use TX FE direct or indirect parameters of the transceiver circuitry associated with TX power.

6. The apparatus of claim 5,
wherein the at least one processor is configured to:
apply a TX power adjustment at an input of a power amplifier of the transceiver circuitry, the TX power adjustment based on the TX FE direct or indirect parameters.

7. The apparatus of claim 5,
wherein the TX FE direct parameters include one or more of the following:
power amplifier (PA) gain for a PA of the transceiver circuitry,
FE insertion loss,
PA saturation power for the PA of the transceiver circuitry,
PA non-linearity characteristics for the PA of the transceiver circuitry,
digital pre-distortion (DPD) characteristics, and
envelope tracking characteristics.

8. The apparatus of claim 5,
wherein the TX FE indirect parameters include one or more of the following parameters associated with the transceiver circuitry:
impedance mismatch,
TX port cross-talk,
TPC inaccuracies,
body-proximity sensor data,
thermal sensor data,
antenna array gain of the at least one antenna, and
antenna efficiency of the at least one antenna.

9. The apparatus of claim 3,
wherein the at least one processor is configured to:
update the at least one LUT for each of the plurality of available communication modes further based on at least one 3 GPP technical specification LUT or a regulatory specification LUT associated with A-MPR.

10. The apparatus of claim 1,
further comprising transceiver circuitry coupled to the at least one processor; and at least two antennas coupled to the transceiver circuitry.

11. The apparatus of claim 10,
wherein the at least one processor is configured to:
apply a transmit power adjustment at an input of a power amplifier of the transceiver circuitry, wherein the transmit power adjustment is based on sensor data from a thermal sensor of the transceiver circuitry.

12. The apparatus of claim 10,
wherein the at least one processor is configured to:
apply a transmit power adjustment at an input of a power amplifier of the transceiver circuitry, wherein the transmit power adjustment is based on sensor data from a power management integrated circuit (PMIC) of the transceiver circuitry.

13. The apparatus of claim 10,
wherein the at least one processor is configured to:
apply a transmit power adjustment at an input of a power amplifier of the transceiver circuitry, wherein the transmit power adjustment is based on sensor data from a body proximity sensor of the transceiver circuitry.

14. A method for operating a user equipment (UE), the method comprising:
by the UE:
decoding baseband configuration information received from a base station, the baseband configuration information including at least a modulation and coding scheme (MCS), resource block (RB) allocation, and carrier assignment for uplink (UL) transmission and downlink (DL) reception;
determining a communication mode from a plurality of available communication modes based on the baseband configuration information, wherein the plurality of available communication modes include an LTE standalone (SA) communication mode, a New Radio (NR) SA communication mode, an LTE-NR dual connectivity (DC) communication mode, and an NR-NR DC communication mode;
selecting an additional maximum power reduction (A-MPR) from at least one A-MPR look-up table (LUT) based on the baseband configuration information and a radio access technology (RAT) of the determined communication mode; and
encoding UL data for transmission to the base station via the selected communication mode and using transmit power adjusted based on the determined A-MPR.

15. The method of claim 14, further comprising the UE:
generating the at least one A-MPR LUT for each of the plurality of available communication modes based on baseband parameters within the baseband configuration information, wherein the baseband parameters are associated with transmit (TX) power.

16. A non-transitory computer-readable storage medium that stores instructions for execution by one or more processors of a user equipment (UE), wherein the instructions configure the UE for dynamic transmit power adjustment and cause the UE to:
decode baseband configuration information received from a base station, the baseband configuration information including at least a modulation and coding scheme (MCS), resource block (RB) allocation, and carrier assignment for uplink (UL) transmission and downlink (DL) reception,
determine a communication mode from a plurality of available communication modes based on the baseband configuration information, wherein the plurality of communication modes correspond to a plurality of radio access technologies (RATs);

determine an additional maximum power reduction (A-MPR) based on the baseband configuration information and the RAT of the determined communication mode; and encode UL data for transmission to the base station via the selected communication mode and using transmit power adjusted based on the determined A-MPR.

17. The non-transitory computer-readable storage medium of claim 16,
wherein the instructions further cause the UE to:
generate at least one A-MPR look-up table (LUT) for each of the plurality of available communication modes based on baseband parameters within the baseband configuration information, the baseband parameters associated with transmit (TX) power; and
determine the A-MPR using the at least one A-MPR LUT.

18. The non-transitory computer-readable storage medium of claim 17,
wherein the baseband parameters signaled to the UE include one or more of the following:
NR TX start time and duration,
LTE TX start time and duration,
LTE bandwidth (BW) allocation,
NR BW allocation,
NR UL waveform,
LTE TX Power Control (TPC),
NR TPC, LTE frequency band,
NR frequency band,
LTE TX power,
NR TX power,
total EUTRA-NR DC (EN-DC) TX power, and
cross-link interference measured at the base station.

19. The non-transitory computer-readable storage medium of claim 17,
wherein the instructions further cause the UE to:
update the at least one LUT for each of the plurality of available communication modes based on radio frequency (RF) calibrations of front-end (FE) circuitry of transceiver circuitry of the UE, wherein the RF calibrations use TX FE direct or indirect parameters of the transceiver circuitry associated with TX power.

20. The non-transitory computer-readable storage medium of claim 19,
wherein the instructions further cause the UE to:
apply a TX power adjustment at an input of a power amplifier of the transceiver circuitry, the TX power adjustment based on the TX FE direct or indirect parameters.

* * * * *